United States Patent [19]
Anderson

[11] 3,777,797
[45] Dec. 11, 1973

[54] SAFETY SUPPORT FOR PNEUMATIC TIRES
[76] Inventor: Hartley G. Anderson, 24130 Chipmunk Tr., Detroit, Mich. 48050
[22] Filed: May 26, 1972
[21] Appl. No.: 257,393

[52] U.S. Cl. .............................................. 152/158
[51] Int. Cl. ........................................... B60c 17/04
[58] Field of Search.................... 152/158, 330, 339

[56] References Cited
UNITED STATES PATENTS

| | | | |
|---|---|---|---|
| 3,142,326 | 7/1964 | Lindley | 152/158 |
| 2,067,545 | 1/1937 | Ricketts, Jr. | 152/158 |
| 3,528,472 | 9/1970 | Kubach | 152/158 |
| 3,550,664 | 12/1970 | Lee | 152/158 |
| 3,635,273 | 1/1972 | Patecell | 152/158 |
| 3,638,701 | 2/1972 | Rossler et al. | 152/158 |
| 3,682,218 | 8/1972 | Johansen et al. | 152/158 |

*Primary Examiner*—Drayton E. Hoffman
*Attorney*—Robert A. Sloman

[57] ABSTRACT

The safety support is adapted for positioning on the drop center type of wheel rim mounting a tubeless tire and consists of a resilient elastomer ring nested and secured within the rim drop center and yieldably mounting and securing a series of arcuate channel sections arranged end to end extending around said ring. An arcuate elastomer strip or a plurality of such strips is mounted upon the outer surface of each section and secured to each other with said strips normally spaced radially inward of the tire inner annular wall when it is inflated but adapted to supportably and yieldably engage said tire inner annular wall on deflation of the tire.

5 Claims, 7 Drawing Figures

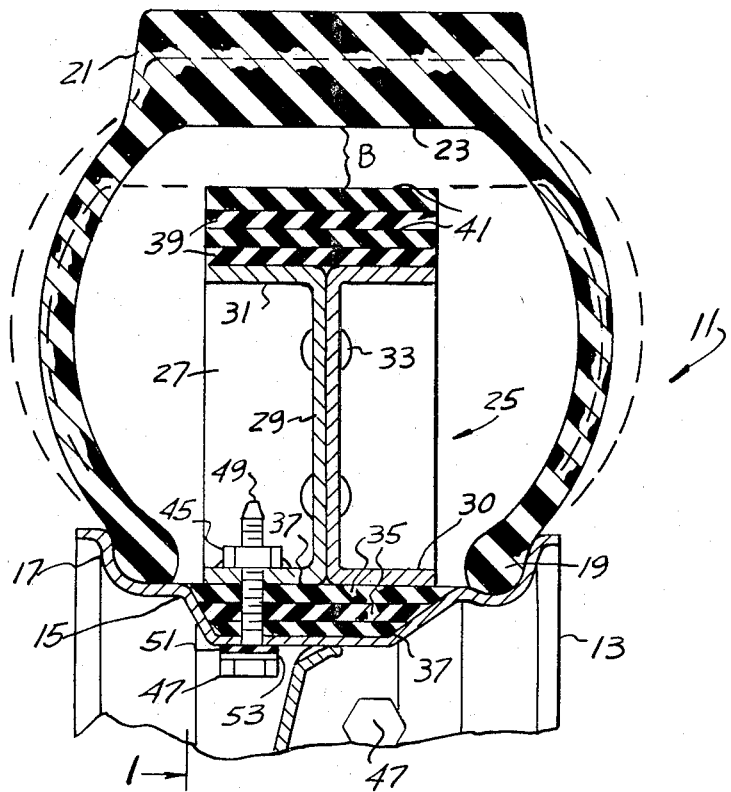
FIG. 2
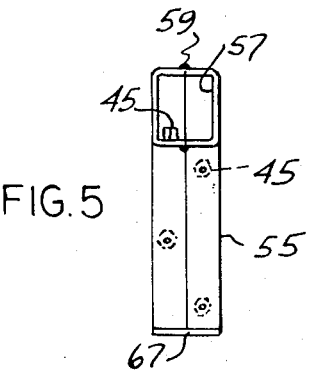
FIG. 5
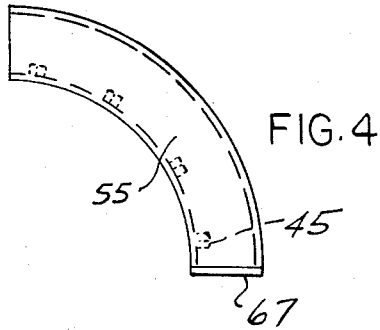
FIG. 4
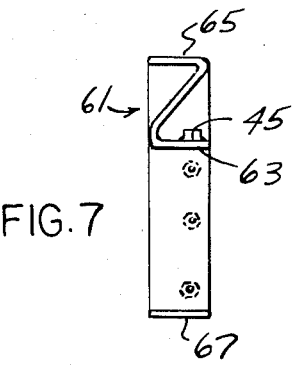
FIG. 7
FIG. 6

SAFETY SUPPORT FOR PNEUMATIC TIRES

BACKGROUND OF THE INVENTION

Heretofore, there has long existed the need of a safety attachment for an inflated vehicle tire to protect the vehicle and support the same during unintended deflation of said tire and to further protect the tire during continued movement over the ground surface.

Various attempts have been made to provide attachments for wheel rims on the exterior thereof which have not been successful and have been expensive, difficult to assemble and impractical.

Heretofore, efforts have also been made to provide a safety type of attachment mountable upon the drop center portion of a wheel rim which mounts a tubeless tire.

These have been, furthermore, complicated and expensive to manufacture and assemble and impractical and, thus, have not been accepted.

The examples of such efforts in the prior art include the following United States patents:

| | |
|---|---|
| 3,420,288 | 3,141,490 |
| 3,180,391 | 3,237,667 |
| 3,550,664 | 3,587,702 |

BRIEF DESCRIPTION OF THE INVENTION

It is an object of the present invention to provide an improved within the tubeless tire safety support mountable upon the drop center portion of a wheel rim in such fashion as to be easy to assemble and to in no manner effect the operation of the wheel during normal inflation of the tire, being spaced inwardly thereof, but which is highly effective on accidental deflation to protect the tire and to permit continued movement over the ground surface.

It is another object to provide a safety support consisting of a series of arcuate sections which are arranged end to end and which are yieldably and resiliently mounted upon the central drop center portion of the rim and fixably secured thereto and wherein there is provided upon the exterior of each section one or more elongated strips of flexible resilient elastomer material, all of which is normally spaced from the inner tire wall during inflation, which cooperatively and yieldably engages the inner wall of the tire on deflation to permit continued movement of the vehicle over the ground surface and at the same time, protecting the tire against damage.

It is a further object of the present invention to provide an improved safety support, wherein, there are provided four sections of approximately 90° each, which are metallic and which are yieldably mounted upon an elastomer ring nested within the drop center portion of the rim and secured thereto, and wherein, elastomer spacers are interposed between the corresponding ends of the sections.

These and other objects will be seen from the following specification and claims in conjunction with the appended drawings in which:

FIG. 2 is an enlarged transverse section of a portion of the rim tire and safety support fully assembled in use position.

FIG. 4 is a side elevational view of a modified support section.

FIG. 5 is an end elevational view thereof.

FIG. 6 is a side elevational view of another modified support section.

FIG. 7 is an end elevational view thereof.

DETAILED DESCRIPTION OF THE INVENTION

Figure 1:
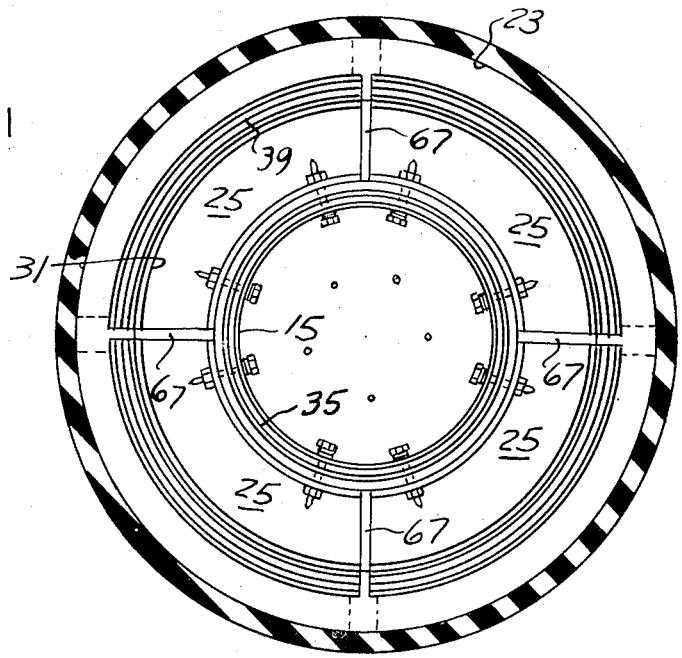
FIG. 1 is a vertical section of the present safety support mounted upon a wheel rim mounting a tubeless tire, such as taken in the direction of arrows 1—1 of FIG. 2.

A safety wheel assembly is generally indicated at 11, FIG. 2 as including wheel 13 fragmentarily shown having a conventional drop center rim 15 including a pair of outer annular flanges 17 to sealingly receive the conventional bead 19 of tire 21 whose inner annular surface is designated at 23.

The present safety support includes a series of arcuate sections 25 which are arranged end to end and extend upon and around said rim and suitably secured thereto individually.

Figure 3:
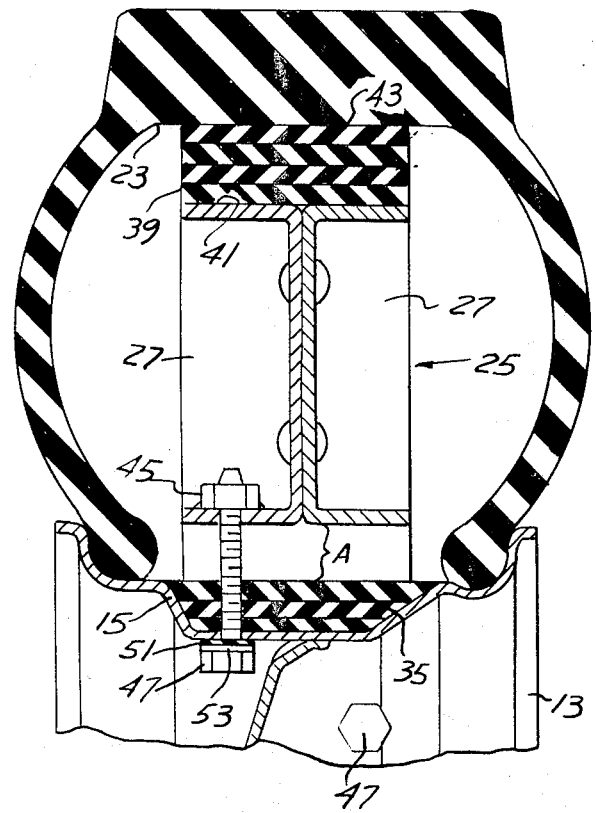
FIG. 3 is a similar view illustrating the initial positioning of the safety support sections secured to the inner annular wall of the tire for and during assembly over the rim which is fragmentarily shown.

In the illustrative embodiment, there are four such sections which extend over an arc of approximately 90°. Each of the arcuate sections 25, as shown in FIGS. 1, 2 and 3 consist of a pair of arcuate elements 27 of U-shape in cross section.

Each element includes a radial web 29, an inner annular flange 30 and an outer annular concentrically arranged flange 31.

The said arcuate elements 17 are arranged back to back and are secured together as by the fasteners 33 or by welding if desired.

Nested and secured within the rim drop center 15 is provided a resilient elastomer ring which in the illustrative embodiment is a series of concentric elastomer strips 35 which are nested within and around the rim drop center by suitable cement as at 37 and similarly secured to each other by such cement.

One or a plurality of resilient elastomer arcuate strips 39 are mounted around the outer annular portion of each section, FIG. 2, and secured thereto by cement 41 and similarly secured to each other to provide a unit resilient outer surface.

In normal operation and functioning of the combination with the tire inflated, the resilient arcuate surface made up of the elastomer strips 39 are spaced as at B form the inner annular wall 23 of the tire.

In the assembled safety support the respective arcuate sections arranged end to end are in a circle and extend around and are yieldably positioned upon the elastomer strip or strips 35 and fixedly secured to the rim by a series of fasteners.

For this purpose, and in the illustrative embodiment, there are provided upon the inner annular flange 30 of each section a series of spaced nuts 45 secured thereto as by welding and with the nuts from opposed elements 27 being staggered with respect to each other.

Fastening is completed by a series of bolts 47 whose non-threaded lead ends 49 project radially outward through corresponding apertures in the rim drop center 15, the elastomer ring or strips 35 through the adjacent section flanges 30 into and through stationary nuts 45.

This provides a means by which the individual arcuate sections are individually and positively anchored to the rim in a yieldable relation as shown in FIGS. 1 and 2.

The fastening includes, furthermore, flexible washer 51 of an elastomer material such as rubber and an outer metallic washer 53.

In the illustrative embodiment of the invention, it is contemplated that the elastomer employed will be a rubber of a durometer in excess of 70. It is contemplated also that other elastomers may be employed which will provide desired resilient characteristic for the ring strips 35, as well as the outer support strips 39 upon said sections.

One specific illustration of an elastomer which may be employed is a high heat resistant, 70 durometer minimum, elastomeric material, i.e., natural rubber, polyurethane and/or silicone.

For the assembly of the present safety support upon and for securing to the rim 13, the said sections 25 are shown in FIG. 3 and in dotted lines in FIG. 1 are secured to the interior surface or inner wall 23 of the tire by the same temporary cement such as shown at 43, FIG. 3, to thus provide as shown in FIG. 3, initial spacing at A to facilitate assembly of the tire and its sections 25 secured thereto over and with respect to the rim 13 for subsequent assembly of the fasteners 47 with respect to the stationary nuts 45.

During the securing operation and the tightening of the bolts 47, the sections are drawn radially inward so as to operably but yieldably engage the resilient strips 35 of the elastomer ring in the drop center portion of the rim as shown in FIG. 2.

During this operation, the outer surfaces of the outer strip or strips upon the sections is pulled away from the inner surface of the tire to provide the normal spacing shown at B, FIG. 2.

A modified section 55 is shown in FIGS. 4 and 5, wherein, the pair of U-shaped elements 57 are of U-shape in cross section and are arranged edge to edge to provide a tubular section and are secured as by the welds 59.

A modified section is shown in FIGS. 6 and 7 as at 61, being of Z-shape in cross section and including inner annular flange 63 and the concentrically arranged outer annular flange 65.

In the preferred embodiment of the present invention, radially arranged spacers 67 of an elastomer material such as rubber are interposed between the adjacent ends of the sections as shown in FIG. 1, and preferably secured to one of the sections, for illustration.

It is contemplated as a part of the present invention that the individual sections 25 may be connected to each other by a suitable fastening means if desired.

The inner diameter of said arcuate sections is equivalent to the largest standard wheel diameter. The outer diameter is equivalent to the smallest inner diameter of any standard tire. Thus, the present safety support is adaptable to all standard sizes of wheels and tires.

The cement used at 37, 41 and 43 is a rubber type of adhesive or an elastomeric type adhesive.

Having described my invention, reference should now be had to the following claims.

I claim:

1. A safety support adapted for positioning on a drop center type wheel rim mounting a tubeless tire comprising:
  a resilient elastomer ring nested and secured within and around the rim drop center;
  a series of unitary arcuate sections of 90° approximately spaced apart and arranged end to end and extending upon and around said ring;
  a plurality of fasteners extending radially outward through said rim and ring retainingly engaging said sections respectively;
  and an arcuate elastomer strip upon and around the outer surface of each section, with the strips of said sections in end to end registry and normally spaced inward of the tire inner annular wall when inflated, a distance less than 20 percent of the distance between the tire inner wall and rim and adapted to supportably and yieldably engage said tire inner annular wall on deflation of said tire, said sections being yieldably and resiliently mounted upon said rim, each section consisting of a pair of arcuate channel elements of U-shape in cross section, and secured together, defining inner and outer concentric flanges;
  each inner flange bearing against said elastomer ring;
  each outer flange supportably engaging said elastomer strip.

2. In the safety support of claim 1, said elastomer ring including a series of concentric circular strips secured to each other, to the rim and to the adjacent section; there being a series of said arcuate elastomer strips upon the outer surface of each section secured to each other.

3. In the safety support of claim 1, said fasteners including a series of spaced prelocated nuts upon the inner flanges of each section in staggered relation, and bolts bearing against and extending through said rim, through said ring and into said nuts, whereby each section is individually anchored to said rim.

4. In the safety support of claim 1, said sections before and during assembly of the tire to said rim being temporarily secured to the inner annular surface of said tire, radially outward of said rim, the successive assembly and tightening of said fasteners drawing said sections into snug engagement with said rim mounted elastomer rim.

5. In the safety support of claim 1, a radially extending elastomer spacer snugly interposed between the adjacent ends of said sections, and secured to at least one of said adjacent sections.

\* \* \* \* \*

UNITED STATES PATENT OFFICE
CERTIFICATE OF CORRECTION

Patent No. 3,777,797          Dated December 11, 1973

Inventor(s) Hartley G. Anderson

It is certified that error appears in the above-identified patent and that said Letters Patent are hereby corrected as shown below:

On the cover sheet item [76] should read as follows:

-- Hartley G. Anderson, 24130 Chipmunk Trail, Novi, Mich. 48050 --.

Signed and sealed this 30th day of April 1974.

(SEAL)
Attest:

EDWARD M. FLETCHER, JR.
Attesting Officer

C. MARSHALL DANN
Commissioner of Patents